United States Patent [19]

Shultz

[11] 4,050,136

[45] Sept. 27, 1977

[54] BEARING RACE DRIVER

[76] Inventor: William E. Shultz, 239 N. Main St., Lombard, Ill. 60148

[21] Appl. No.: 656,781

[22] Filed: Feb. 10, 1976

[51] Int. Cl.$^2$ .................... B21D 53/10; B23P 19/04

[52] U.S. Cl. .................... 29/724; 29/263; 29/265; 29/258

[58] Field of Search .................... 29/149.5 R, 263, 265, 29/201, 201 D, 148.4 A, 258

[56] References Cited

U.S. PATENT DOCUMENTS

| | | | |
|---|---|---|---|
| 1,587,153 | 6/1926 | Hendrickson | 29/265 |
| 1,851,421 | 3/1932 | Conklin | 29/263 UX |
| 1,857,211 | 5/1932 | Odlum et al. | 29/263 |
| 1,970,682 | 8/1934 | Yordi | 29/263 |
| 3,052,973 | 9/1962 | Williams | 29/265 |

FOREIGN PATENT DOCUMENTS

| | | | |
|---|---|---|---|
| 844,419 | 4/1939 | France | 29/263 |
| 1,115,341 | 12/1955 | France | 29/263 |
| 262,626 | 10/1949 | Switzerland | 29/263 |
| 301,528 | 11/1954 | Switzerland | 29/201 |

*Primary Examiner*—C.W. Lanham
*Assistant Examiner*—V. K. Rising
*Attorney, Agent, or Firm*—Richard H. Anderson

[57] ABSTRACT

A tool is provided for inserting bearings comprising a plurality of expandable segments, a shaft having a cam means attached thereto said cam means including means for expanding each of said expandable segments radially outwardly from said shaft, wherein the expandable segments have at least one flange portion for abutting a bearing race and driving the bearing race into position such that expansion of the expandable segments increases the distance of said flange portion of each expandable segment radially outwardly from said shaft and adapts said flange portions for abutting engagement with various diameter bearing races. In this manner, a single tool can drive a number of different diameter bearing races without removing and reattaching parts.

8 Claims, 6 Drawing Figures

BEARING RACE DRIVER

BACKGROUND OF THE INVENTION

A. Field of the Invention

This invention relates to a tool for driving bearings and more particularly relates to a tool for inserting bearing races into position. The tool includes a plurality of bearing drive shoulders and the diameter of these drive shoulders can be adjusted by expanding or contracting individual segments of the bearing drive shoulders.

B. Prior Art

It is known to employ tools having a plurality of detachable drive collars for the purpose of inserting bearing races of varying diameters into position. One such tool, as disclosed in U.S. Pat. No. 3,651,553, requires a separate detachable drive collar for each different diameter bearing race to be inserted. Accordingly, it is necessary for the mechanic first to determine the diameter of the bearing race, then to detach the drive collar from the tool and replace it with the drive collar having the proper diameter. Thus, for each different diameter bearing race to be inserted, the mechanic must detach and attach a drive collar which process becomes burdensome, time-consuming and often results in the loss of some of the drive collars necessary in replacing all bearing races. In accordance with the present invention, a single tool having only two drive shoulders can be expanded to accommodate wide range of bearings or bearing races without removal of any parts from the tool. My prior U.S. Pat. No. 3,324,701 discloses a device of similar structure but relates to a tool for reshaping metal tubular articles and neither discloses nor suggests bearing drive shoulders or any use of such a tool for driving bearings.

SUMMARY OF THE INVENTION

The tool of the present invention comprises an elongated shaft, a cam means attached at the bearing contacting end of the tool, and a plurality of segments expandable by said cam means. The expandable segments are clustered around the cam means and by axial movement of the cam means along the shaft, the segments expand radially outwardly with respect to the shaft. The cam means has a plurality of wedge shaped surfaces, one such surface engaging the under surface of each expandable segment. When the cam means moves axially into the expandable segments, the expandable segments move radially outwardly from the shaft. Carried on each of the expandable segments, and preferably an integral part of each of said expandable segments, is at least one and preferably smaller and larger diameter annular shoulder or flange portions having substantially flat bearing contacting surfaces. Corresponding annular shoulder portions from each expandable segment lie in substantially the same plane to form an annular or spaced-annular bearing contacting surface. When the segments radially expand, by axial movement of the cam means, the diameter of the annular shoulder portions increases forming an increased diameter spaced annular bearing contacting surface to accommodate various diameter bearings or bearing races. In a preferred embodiment, the smaller diameter annular flange portions can be expanded to accommodate all bearing races having a diameter larger than the unexpanded smaller flanges and smaller than the unexpanded larger flanges. In this manner, a single tool can be used to insert various diameter bearings or bearing races without the need to detach and reattach any parts.

Accordingly, it is an object of the present invention to provide a new and improved tool capable of inserting or installing a plurality of different diameter bearings or bearing races.

Another object of the present invention is to provide a new and improved tool having expandable driving shoulder surfaces for abutting contact with various diameter bearings or bearing races.

A further object of the present invention is to provide a new and improved bearing race driver capable of installing bearing races in wheel bearings, differentials and capable of installing pinion bearing races.

A further object of the present invention is to provide a new and improved tool for inserting bearings or bearing races whereby an operator can turn a handle to provide a driving flange of any needed diameter.

These and other objects and advantages of the present invention will become apparent from the following detailed description and the drawing.

DETAILED DESCRIPTION OF THE PREFERRED EMBODIMENT

Figure 1:
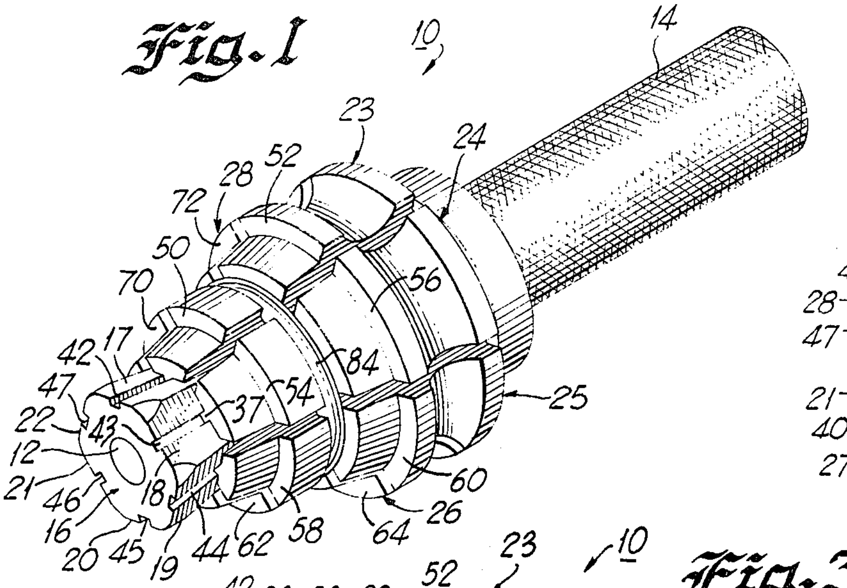
FIG. 1 is a perspective view of the new and improved tool constructed in accordance with the principles of the present invention and having its driving flanges partially expanded.
Figure 2:
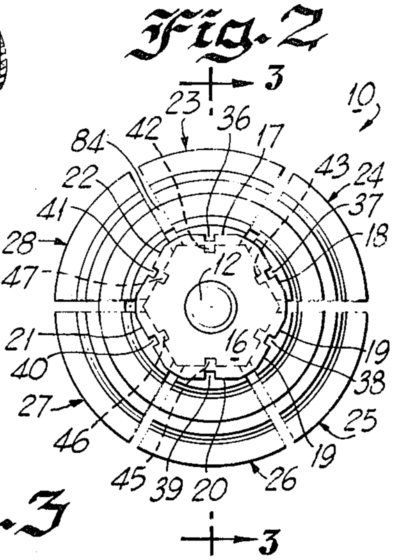
FIG. 2 is an end view of the new and improved tool of the present invention taken along the line 2—2 of FIG. 1
Figure 3:
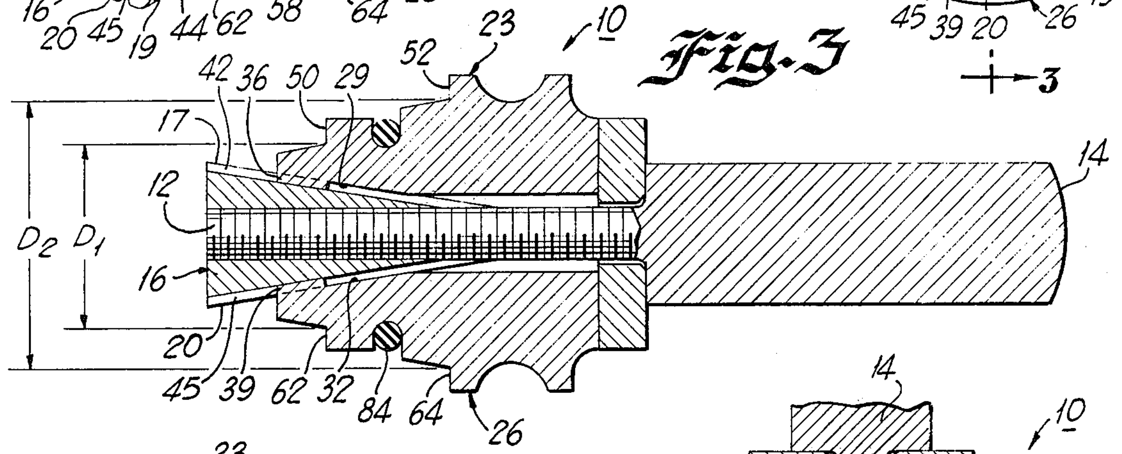
FIG. 3 is an elevated, broken-away side view of the new and improved tool of the present invention taken along the line 3—3 of FIG. 2.

Turning now to the drawing, and initially to FIGS. 1–3, like reference numerals will be used to designate corresponding parts throughout the several views. The device of the present invention, indicated generally by reference numeral 10, includes a spindle or shaft 12 fixedly attached to a driving handle 14. The shaft 12 is externally threaded at its forward end to receive an internally threaded cam member, indicated generally by reference numeral 16. The cam member 16 is generally conically shaped to form a wedge, diverging inwardly toward the shaft 12 in a direction toward the handle 14. In a preferred embodiment, the cam member 16 is provided with a series of six duplicate grooved faces 17, 18, 19, 20, 21 and 22 (FIG. 2) which correspond generally to the faces of a hexagonally based pyramid with the faces extending in uniformly converging relation in a direction toward the handle 14. These faces 17–22 provide rearwardly and radially inwardly sloping surfaces in the direction of the handle 14.

Figure 6:
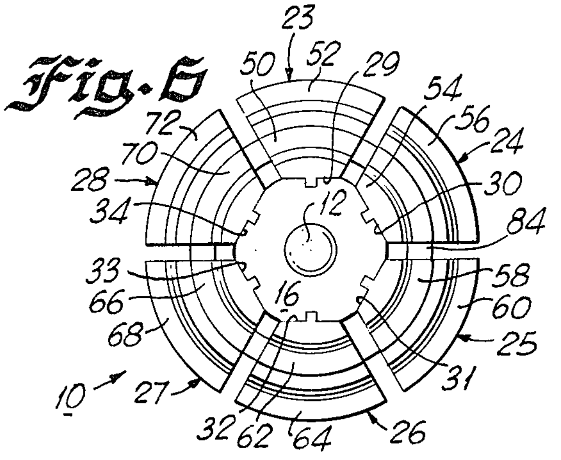
FIG. 6 is an end view of the new and improved tool of the present invention, similar to FIG. 2, in its fully expanded position.

In sliding engagement with the cam member faces 17–22 there is provided a corresponding number of expandable segments 23, 24, 25, 26, 27 and 28 (FIG. 2) having cam members face engaging surfaces 29, 30, 31,

32, 33 and 34 (FIG. 6). These surfaces 29–34 slidably engage the corresponding and opposed cam member faces 17–23 when the handle 1 is turned to cause corresponding axial movement of the cam member 16 toward the handle 14 thereby causing the segments 23–28 to expand. As shown in the drawing, the cam member face engaging surfaces 29–34 have ribs or guide members 36, 37, 38, 39, 40 and 41 nesting unto corresponding grooves 42, 43, 44, 45, 46 and 47 (FIG. 2) in the corresponding opposed faces 17–22 of the cam member 16 to maintain the expandable segments in a substantially evenly spaced cluster about the cam member 16. These central grooves 42–47 and corresponding ribs guide the expandable segments 23–28 centrally along the corresponding cam member faces 17–22 to maintain the segments evenly spaced about cam member 16 as cam member 16 is moved axially toward or away from handle 14 to expand or contract said segments, respectively.

Figure 5:
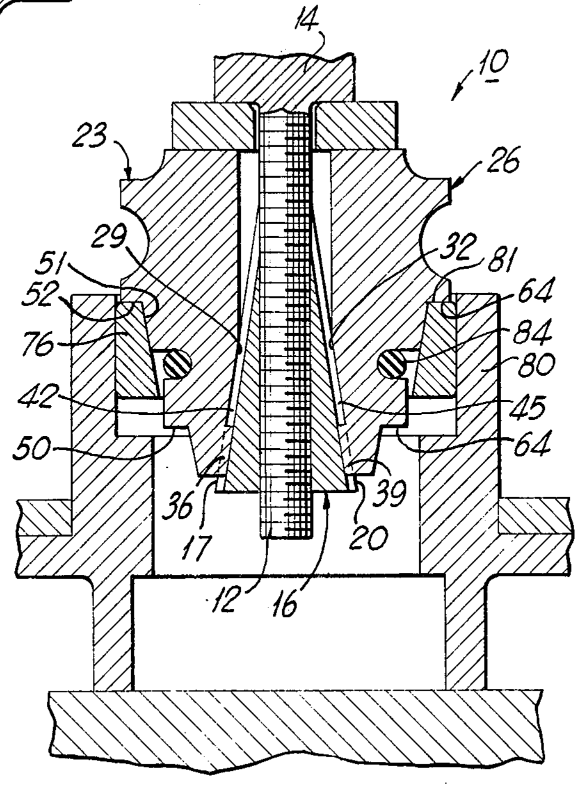
FIG. 5 is a partially broken-away, elevated side view of the new and improved tool of the present invention driving a bearing race into position.

It is an important feature of the present invention to maintain the expandable segments evenly spaced as the segments are expanded. Evenly spaced segments 17–22 will provide bearing drive shoulders taking a spaced annular shape so that the bearing drive shoulders can engage the top surface of an annular bearing race 66, as shown in FIG. 5, without the segments extending beyond the top surface of the bearing race. If the segments are not evenly spaced, the segments will be misaligned such that the bearing drive shoulders do not take a spaced annular shape. When misaligned, a portion of one or more of the segments may extend beyond the top surface of bearing race 66 and be hindered from downward movement because of contact with bearing race retainer or hub 80.

In accordance with another important feature of the present invention, the outwardly facing surface of each expandable segment 23–28 is provided with a plurality of two bearing drive shoulders. Referring more particularly to FIG. 1, segment 23 is provided with smaller shoulder 50 and larger shoulder 52, each shoulder an integral part of segment 23 and shoulder 52 disposed closer to handle 14 and a greater radial distance from shaft 12 than shoulder 50. Similarly, segment 24 is provided with smaller shoulder 54 and larger shoulder 56, each shoulder an integral part of segment 24 and shoulder 56 disposed closer to handle 14 and a greater radial distance from shaft 12 than shoulder 54; and segment 25 is provided with smaller shoulder 58 and larger shoulder 60, each shoulder an integral part of segment 25 and shoulder 60 disposed closer to handle 14 and a greater radial distance from shaft 12 than shoulder 58. In a like manner, as shown in FIG. 6, segment 26 is provided with shoulders 62 and 64; segment 27 is provided with shoulders 66 and 68; and segment 28 is provided with shoulders 70 and 72. Each shoulder 50, 52, 54, 56, 58, 60, 62, 64, 66, 68, 70 and 72 comprises a substantially flat annular surface lying in a plane perpendicular to the longitudinal axis of shaft 12. When the segments are clustered around cam member 16, the bearing drive shoulders 50, 54, 58, 62, 66 and 70 lie in a common plane disposed perpendicularly to the longitudinal axis of shaft 12 to form a smaller diameter annular bearing race drive surface. Likewise, when the segments are clustered around cam member 16, the bearing drive shoulders 52, 56, 60, 64, 68 and 72 lie in a different plane, disposed perpendicularly to the longitudinal axis of shaft 12, to form a larger diameter annular bearing race drive surface.

By turning handle 14, cam member 16 can be caused to axially move toward the handle 14 to expand segments 23–28, thereby creating spaces between each of the segments and between each of the drive surfaces as best shown in FIG. 1. The segments 23–28 expand outwardly while maintaining the smaller drive shoulders 50, 54, 58, 62 and 70, forming the smaller diameter bearing race drive surface, in their respective plane and while maintaining the larger drive shoulders 52, 56, 60, 64, 68 and 72, forming the larger diameter bearing race drive surface, in their respective plane. The shoulders thereby move radially (not axially) with respect to the shaft 12 to provide the mechanic with an easy method of measuring the needed diameter.

In accordance with another important feature of the present invention, the smaller diameter bearing race drive surface formed by smaller bearing drive shoulders 50, 54, 58, 62 and 70 can be increased in diameter to all diameters between the unexpanded diameter of the smaller drive surface and the unexpanded diameter of the larger drive surface. In this manner, the tool of the present invention can accomodate all annular bearing races having an internal diameter between $D_1$ and $D_2$, as shown in FIG. 3.

Figure 4:
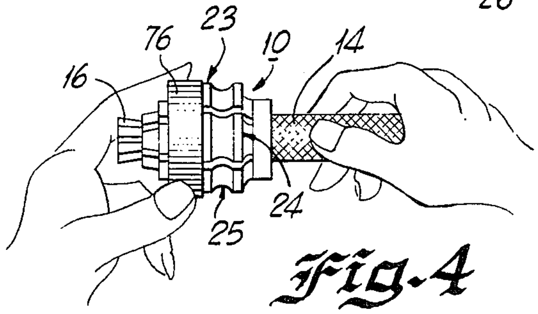
FIG. 4 is a side view of the new and improved tool of the present invention showing an operator expanding the flanges to fit a bearing race for insertion.

Turning now to FIG. 4, by positioning a bearing or bearing race 76 into near engagement with the smaller or larger diameter bearing drive shoulders of each segment 23–28, the mechanic can turn handle 14 until the smaller or larger diameter bearing drive surface is the proper diameter to fit the bearing or bearing race. As best shown in FIG. 5, the outwardly facing surfaces of each expandable segment are of arcuate cross-sectional contour in planes perpendicular to the shaft 12 to fit within the bearing race, and in a preferred embodiment, the outwardly facing surfaces are sloped inwardly toward shaft 12 in a direction away from handle 14. In this manner, the arcuate outward sloping surfaces of each expandable segment are adapted to nest snugly against the interior of a bearing race while the bearing drive shoulders engage the top surface 81 of the bearing race.

Turning now to FIG. 5, a bearing race 76 is shown being driven into position within the bearing retainer or hub 80, using a tool constructed in accordance with the principles of the present invention. It is understood that the device of the present invention can be used for driving bearings or bearing races within any means for holding such bearings or bearing races. An axial force for driving the bearing race into position can be provided by a hammer. As shown in FIG. 5, the expandable segments are held together around cam means 16 and shaft 12 by a retainer means 84, such as a spring.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A tool for inserting bearings comprising a plurality of expandable segments, a shaft having a cam means attached thereto, said cam means including means for expanding each of said expandable segments radially outwardly from said shaft, each of said expandable segments having a first bearing drive shoulder and a second bearing drive shoulder, said second bearing drive shoulder disposed at a greater radial distance from a longitudinal axis of said shaft than said first radial drive shoulder, wherein said first bearing drive shoulders of said expandable segments form a first substantially flat annular drive surface lying in a plane substantially perpendicular to the longitudinal axis of said shaft, and said second bearing drive shoulders of said expandable segments form a second substantially flat annular drive surface lying in a plane substantially perpendicular to the longitudinal axis of said shaft, said second annular drive surface disposed at a greater radial disance from said longitudinal axis of said shaft than said first annular drive surface, said first and second annular drive surfaces capable of abuting bearing races of different diameters.

2. A tool as defined in claim 1 wherein said cam means expands said expandable segments when moved along said shaft in a direction from said first annular drive surface toward said second annular drive surface.

3. A tool as defined in claim 1 wherein said first annular drive surface is capable of expansion to all diameters between an unexpanded diameter of said first annular drive surface and an unexpanded diameter of said second annular drive surface.

4. A tool as defined in claim 1 wherein each of said expandable segments includes an outwardly facing surface having an arcuate cross-sectional contour in planes perpendicular to the shaft and wherein said outwardly facing surfaces are sloped inwardly toward said shaft in a direction from said second annular drive surface to said first annular drive surface.

5. A tool as defined in claim 1 wherein each of said expandable segments is of substantially duplicate size and shape.

6. A tool as defined in claim 1 further including means for flexibly retaining said expandable segments in engagement with said cam means, when in operable position.

7. A tool as defined in claim 1 further including a handle and wherein said cam means includes a number of expandable segment engaging surfaces matching the number of said expandable segments, each segment engaging surface diverging inwardly toward said shaft in a direction toward said handle and allowing sliding engagement of said segments with the engaging surfaces of said cam.

8. A tool as defined in claim 1 including means for moving said cam means axially along said shaft for radial movement of each of said expandable segments with respect to said shaft.

* * * * *